United States Patent
Matsumoto et al.

(10) Patent No.: US 10,683,910 B2
(45) Date of Patent: Jun. 16, 2020

(54) POWER TRANSMISSION MECHANISM

(71) Applicant: TOYOTA JIDOSHA KABUSHIKI KAISHA, Toyota-shi, Aichi-ken (JP)

(72) Inventors: Morihiro Matsumoto, Susono (JP); Tadashi Takagaki, Toyota (JP); Shinobu Ishida, Toyota (JP); Tetsuo Hamajima, Nissin (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 86 days.

(21) Appl. No.: 15/783,571

(22) Filed: Oct. 13, 2017

(65) Prior Publication Data

US 2018/0149235 A1    May 31, 2018

(30) Foreign Application Priority Data

Nov. 29, 2016   (JP) .................. 2016-231792

(51) Int. Cl.
 *F16H 1/08* (2006.01)
 *F16H 57/022* (2012.01)
 *F16H 57/02* (2012.01)

(52) U.S. Cl.
 CPC ............ *F16H 1/08* (2013.01); *F16H 57/022* (2013.01); *F16H 2057/0221* (2013.01); *F16H 2057/02043* (2013.01)

(58) Field of Classification Search
 CPC ... B60K 6/00; B60K 6/20; B60K 6/22; B60K 6/26; B60K 6/36; F16H 1/20; F16H 1/206; F16H 1/26; F16H 1/08; F16H 57/0025; F16H 57/02004; F16H 57/021; F16H 57/022; F16H 2057/02021; F16H 2057/0221

USPC ................... 74/401, 410, 392, 403
See application file for complete search history.

(56) References Cited

U.S. PATENT DOCUMENTS

| | | | | |
|---|---|---|---|---|
| 1,273,556 A | * | 7/1918 | Warriner | F16H 1/22 74/410 |
| 1,357,932 A | * | 11/1920 | Hodgkinson | F16H 1/206 74/410 |
| 2,203,282 A | * | 6/1940 | Keese | F16H 48/08 475/206 |

(Continued)

FOREIGN PATENT DOCUMENTS

| CN | 103979387 A | 8/2014 |
|---|---|---|
| GB | 791594 A | 3/1958 |

(Continued)

*Primary Examiner* — Jake Cook
*Assistant Examiner* — T. Scott Fix
(74) *Attorney, Agent, or Firm* — Hunton Andrews Kurth LLP

(57) ABSTRACT

With respect to a relation between an amount of axial displacement of a first bearing as well as an amount of axial displacement of a second bearing relative to an axial force generated at a meshing part between a first double-helical gear and a second double-helical gear, and an amount of axial displacement of the second bearing as well as an amount of axial displacement of a third bearing relative to an axial force generated at a meshing part between a third double-helical gear and a fourth double-helical gear, the second bearing is configured to have a smaller amount of axial displacement than that of at least one of the first bearing and the third bearing.

16 Claims, 7 Drawing Sheets

(56) References Cited

U.S. PATENT DOCUMENTS

| | | | | |
|---|---|---|---|---|
| 2,257,747 | A * | 10/1941 | Jones, Jr. | F16H 1/20 74/421 R |
| 2,734,396 | A * | 2/1956 | Falk et al. | F16H 37/00 74/665 B |
| 4,022,083 | A * | 5/1977 | Pollak-Banda | F16H 57/022 74/665 B |
| 4,188,821 | A * | 2/1980 | Elias | G01L 3/108 73/862.31 |
| 4,641,543 | A * | 2/1987 | Jessup | F16H 1/206 74/410 |
| 4,709,590 | A * | 12/1987 | Richards | F16H 1/206 74/331 |
| 6,189,397 | B1 * | 2/2001 | Morrow | F16H 3/095 74/331 |
| 2001/0050190 | A1 * | 12/2001 | Takenaka | B60L 50/16 180/65.235 |
| 2002/0036106 | A1 * | 3/2002 | Hanyu | B60K 6/24 180/65.235 |
| 2005/0023885 | A1 * | 2/2005 | Bennett | B60K 6/36 301/124.1 |
| 2010/0064832 | A1 * | 3/2010 | Sullivan | F16H 1/08 74/332 |
| 2010/0187026 | A1 * | 7/2010 | Knoblauch | B60K 1/02 180/65.1 |
| 2013/0042709 | A1 * | 2/2013 | Li | F16H 3/095 74/331 |
| 2014/0335998 | A1 * | 11/2014 | Ichikawa | F16H 57/0006 477/5 |
| 2015/0291151 | A1 * | 10/2015 | Shigeta | F16H 1/08 701/22 |

FOREIGN PATENT DOCUMENTS

| | | |
|---|---|---|
| JP | 2016-056888 A | 4/2016 |
| WO | 1999/060289 A1 | 11/1999 |
| WO | 2007/024176 A1 | 3/2007 |

* cited by examiner

LEFT ←—————→ RIGHT
AXIAL DIRECTION

FIG. 3

| AXIAL RIGIDITY | SMALL ⬅————————————➡ GREAT | | | |
|---|---|---|---|---|
| TYPE | CYLINDRICAL ROLLER BEARING | DEEP GROOVE BALL BEARING | ANGULAR CONTACT BALL BEARING | TAPER ROLLER BEARING |

FIG. 6

| AXIAL INTERNAL GAP | SMALL ←――――――――――――→ GREAT | | |
|---|---|---|---|
| TYPE | ANGULAR CONTACT BALL BEARING | DEEP GROOVE BALL BEARING | CYLINDRICAL ROLLER BEARING |
| | TAPER ROLLER BEARING | | |

| AXIAL RIGIDITY | SMALL ←————————→ GREAT | | |
|---|---|---|---|
| | X > 52% | X = 52% | X = 50% |

X = RACEWAY SURFACE RADIUS / BALL RADIUS × 100

| AXIAL INTERNAL GAP | SMALL ←————————→ GREAT | | |
|---|---|---|---|
| | X = 50% | X = 52% | X > 52% |

X = RACEWAY SURFACE RADIUS / BALL RADIUS × 100

POWER TRANSMISSION MECHANISM

INCORPORATION BY REFERENCE

The disclosure of Japanese Patent Application No. 2016-231792 filed on Nov. 29, 2016 including the specification, drawings and abstract is incorporated herein by reference in its entirety.

BACKGROUND

1. Technical Field

The present disclosure relates to a power transmission mechanism.

2. Description of Related Art

As a power transmission mechanism installed in a vehicle, Japanese Patent Application Publication No. 2016-56888 discloses a power transmission mechanism in which a final gear pair including a final drive gear and a final driven gear that mesh with each other is composed of a gear pair whose double-helical gears mesh with each other.

SUMMARY

In the gear pair whose double-helical gears mesh with each other, if the double-helical gears have an error component (mesh deviation), the double-helical gears come into a single-flank contact at a meshing part thereof, thus generating a force in the axial direction. Due to this axial force, the double-helical gears move in the axial direction, so that an aligning effect acts such that the double-helical gears come into a double-flank contact with each other at the meshing part thereof. For this reason, double-helical gears can reduce vibrations and noises, compared with spur gears.

However, if a single rotational shaft is provided with multiple double-helical gears, respective axial forces are generated at the multiple meshing parts; therefore, axial behaviors of the multiple double-helical gears might interfere with each other on the same axis, which causes mutual hindrance to their aligning effects.

The present disclosure provides a power transmission mechanism capable of securing aligning effects of multiple double-helical gears if these multiple double-helical gears are provided on the same axis.

The present disclosure is characterized by providing a power transmission mechanism that includes: a first shaft including a first double-helical gear; a second shaft including a second double-helical gear meshing with the first double-helical gear, and a third double-helical gear arranged adjacent to the second double-helical gear in an axial direction; a third shaft including a fourth double-helical gear meshing with the third double-helical gear; a first bearing being a rolling bearing rotatably supporting the first shaft; a second bearing being a rolling bearing rotatably supporting the second shaft; and a third bearing being a rolling bearing rotatably supporting the third shaft, wherein the first double-helical gear and the first shaft are configured to integrally rotate, and also integrally move in the axial direction, the second double-helical gear, the third double-helical gear, and the second shaft are configured to integrally rotate, and also integrally move in the axial direction, the fourth double-helical gear and the third shaft are configured to integrally rotate, and also integrally move in the axial direction, and with respect to a relation between an amount of axial displacement of the first bearing as well as an amount of axial displacement of the second bearing relative to a force in an axial direction generated at a meshing part between the first double-helical gear and the second double-helical gear, and the amount of axial displacement of the second bearing as well as an amount of axial displacement of the third bearing relative to a force in the axial direction generated at a meshing part between the third double-helical gear and the fourth double-helical gear, the second bearing is configured to have a smaller axial displacement than that of at least one of the first bearing and the third bearing.

In the present disclosure, the second bearing supporting multiple double-helical gears is configured to have a smaller amount of axial displacement than that of at least one of the first bearing and the third bearing each of which supports a single double-helical gear. Specifically, relative to the force in the axial direction generated at the meshing part between the first double-helical gear and the second double-helical gear, the first double-helical gear more easily moves in the axial direction than the second double-helical gear does; therefore, the aligning effect of the gear pair where the first double-helical gear and the second double-helical gear mesh with each other is secured by the axial behavior of the first double-helical gear. Relative to the force in the axial direction generated at the meshing part between the third double-helical gear and the fourth double-helical gear, the fourth double-helical gear more easily moves in the axial direction than the third double-helical gear does; thus the aligning effect of the gear pair where the third double-helical gear and the fourth double-helical gear mesh with each other is secured by the axial behavior of the fourth double-helical gear. Through this, it is possible to suppress that the axial behavior of the second double-helical gear and the axial behavior of the third double-helical gear interfere with each other on the second shaft, causing mutual hindrance to their aligning effects.

In the present disclosure according to the above disclosure, it is preferable that an axial rigidity of the second bearing is greater than at least one of an axial rigidity of the first bearing and an axial rigidity of the third bearing.

In the above disclosure, the second bearing supporting the multiple double-helical gears is configured to have a greater axial rigidity than that of at least one of the first bearing and the third bearing each of which supports the single double-helical gear. The axial rigidity represents a degree of difficulty of axial deformation relative to the force in the axial direction. Hence, the first double-helical gear more easily moves in the axial direction than the second double-helical gear does, and the fourth double-helical gear more easily moves in the axial direction than the third double-helical gear does. Through this, it is possible to suppress that on the second shaft, the axial behavior of the second double-helical gear and the axial behavior of the third double-helical gear interfere with each other, causing mutual hindrance to their aligning effects.

In the present disclosure according to the above disclosure, it is preferable that at least one of the first bearing and the third bearing is so formed as to have a greater axial internal gap than that of the second bearing, the axial internal gap being an amount of movement of one bearing ring of internal and external bearing rings when the one bearing ring moves in the axial direction with the other bearing ring of the internal and the external bearing rings ring fixed.

In the above disclosure, the second bearing supporting the multiple double-helical gears is configured to have a smaller axial internal gap than that of at least one of the first bearing and the third bearing each of which supports the single double-helical gear. The axial internal gap represents a movable amount in the axial direction of the bearing ring of interest. Hence, it is configured that the first double-helical gear more easily moves in the axial direction than the second double-helical gear does, and the fourth double-helical gear more easily moves in the axial direction than the third double-helical gear does. Through this, it is possible to suppress that on the second shaft, the axial behavior of the second double-helical gear and the axial behavior of the third double-helical gear interfere with each other, causing mutual hindrance to their aligning effects.

In the present disclosure according to the above disclosure, it is preferable that the second bearing is a bearing to which pre-compression in the axial direction is applied, and the second bearing is a bearing of a different type from that of at least one of the first bearing and the third bearing.

In the above disclosure, the second bearing is a bearing to which pre-compression in the axial direction is applied, and thus the second double-helical gear and the third double-helical gear that are supported by the second bearing are configured to be more difficult to move in the axial direction. Through this, it is possible to suppress that on the second shaft, the axial behavior of the second double-helical gear and the axial behavior of the third double-helical gear interfere with each other, causing mutual hindrance to their aligning effects.

In the present disclosure according to the above disclosure, it is preferable that the first bearing is composed of a cylindrical roller bearing or a deep groove ball bearing, the second bearing is composed of a taper roller bearing, and the third bearing is composed of a cylindrical roller bearing or a deep groove ball bearing.

In the above disclosure, an amount of axial displacement of the taper roller bearing is smaller than that of the cylindrical roller bearing and the deep groove ball bearing, and thus the second bearing is configured to have a smaller amount of axial displacement than that of the first bearing and the third bearing. In this manner, the amount of axial displacement can be different by using different types of rolling bearings.

In the present disclosure according to the above disclosure, it is preferable that each of the first bearing, the second bearing, and the third bearing is a ball bearing that includes bearing rings having raceway surfaces, and balls rolling on the raceway surfaces, and the second bearing is so formed as to have a smaller minimum value of a ratio of radius of curvature in the raceway surface relative to a diameter of each ball than that of at least one of the first bearing and the third bearing.

In the above disclosure, the second bearing supporting the multiple double-helical gears is so formed as to have a smaller minimum value of the ratio of radius of curvature in the raceway surface relative to the diameter of each ball than that of at least one of the first bearing and the third bearing each of which supports the single double-helical gear. This ratio represents a movable amount in the axial direction of the bearing ring of interest. Hence, it is configured that the first double-helical gear more easily moves in the axial direction than the second double-helical gear does, and the fourth double-helical gear more easily moves in the axial direction than the third double-helical gear does. Through this, it is possible to suppress that on the second shaft, the axial behavior of the second double-helical gear and the axial behavior of the third double-helical gear interfere with each other, causing mutual hindrance to their aligning effects.

In the present disclosure according to the above disclosure, it is preferable that the first bearing is composed of a deep groove ball bearing, the second bearing is composed of a deep groove ball bearing, and the third bearing is composed of a deep groove ball bearing.

The present disclosure according to the above disclosure preferably further includes: a fourth shaft including a fifth double-helical gear meshing with the second double-helical gear; and a fourth bearing being a rolling bearing rotatably supporting the fourth shaft, wherein with respect to a relation between an amount of axial displacement of the first bearing and an amount of axial displacement of the second bearing relative to a force in the axial direction generated at a meshing part between the second double-helical gear and the fifth double-helical gear, the second bearing has a smaller amount of axial displacement than that of the fourth bearing.

In the above disclosure, the second bearing is configured to have a smaller amount of axial displacement than that of the fourth bearing supporting the multiple double-helical gears. Specifically, the fifth double-helical gear on the fourth bearing side, which has a relatively great amount of axial displacement relative to the force in the axial direction generated at the meshing part between the second double-helical gear and the fifth double-helical gear, more easily moves in the axial direction than the second double-helical gear does. Hence, an aligning effect of a gear pair where the second double-helical gear and the fifth double-helical gear mesh with each other is secured by axial behavior of the fifth double-helical gear.

In the present disclosure according to the above disclosure, it is preferable that the axial rigidity of the second bearing is greater than an axial rigidity of the fourth bearing, and is also greater than at least one of the axial rigidity of the first bearing and the axial rigidity of the third bearing.

In the above disclosure, the second bearing is configured to have a greater axial rigidity than that of the fourth bearing supporting the single double-helical gear. Specifically, the fifth double-helical gear on the fourth bearing side whose axial rigidity is relatively small more easily moves in the axial direction relative to the force in the axial direction generated at the meshing part between the second double-helical gear and the fifth double-helical gear than the second double-helical gear does. Hence, the aligning effect of the gear pair where the second double-helical gear and the fifth double-helical gear mesh with each other is secured by the axial behavior of the fifth double-helical gear.

The present disclosure according to the above disclosure preferably further includes: a fourth shaft including a fifth double-helical gear meshing with the second double-helical gear; and a fourth bearing being a rolling bearing rotatably supporting the fourth shaft, and the fourth bearing is so formed as to have a greater axial internal gap than that of the second bearing.

In the above disclosure, the second bearing is configured to have a smaller axial internal gap than that of the fourth bearing supporting the single double-helical gear. Specifically, the fifth double-helical gear on the fourth bearing side whose axial internal gap is relatively great more easily moves in the axial direction relative to the force in the axial direction generated at the meshing part between the second double-helical gear and the fifth double-helical gear than the second double-helical gear does. Hence, the aligning effect of the gear pair where the second double-helical gear and the fifth double-helical gear mesh with each other is secured by the axial behavior of the fifth double-helical gear.

In the present disclosure according to the above disclosure, it is preferable that the second bearing is a bearing of a different type from that of the fourth bearing, and is also a bearing of a different type from that of at least one of the first bearing and the third bearing.

In the present disclosure according to the above disclosure, it is preferable that each of the first bearing, the second bearing, the third bearing, and the fourth bearing is a ball bearing that includes bearing rings having raceway surfaces, and balls rolling on the raceway surfaces, the second bearing is so formed as to have a smaller minimum value of a ratio of radius of curvature in the raceway surface relative to a diameter of each ball than that of the fourth bearing, and this minimum value is also smaller than that of at least one of the first bearing and the third bearing.

In the above disclosure, the second bearing is configured to have a smaller minimum value of the ratio of radius of curvature in the raceway surface relative to the diameter of each ball than that of the fourth bearing supporting the single double-helical gear. Specifically, the fifth double-helical gear on the fourth bearing side whose minimum value is relatively great more easily moves in the axial direction relative to the force in the axial direction generated at the meshing part between the second double-helical gear and the fifth double-helical gear than the second double-helical gear does. Hence, the aligning effect of the gear pair where the second double-helical gear and the fifth double-helical gear mesh with each other is secured by the axial behavior of the fifth double-helical gear.

According to the present disclosure, it is possible to suppress that the axial behaviors of the double-helical gears interfere with each other on the gear shaft meshing with the multiple double-helical gears, causing mutual hindrance to their aligning effects. Through this, it is possible to secure the aligning effects of the double-helical gears on the gear shaft meshing with the multiple double-helical gears.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 3 is a view explaining a relation between an axial rigidity of a rolling bearing and each type of rolling bearings;

FIG. 6 is a view explaining a relation between an axial internal gap of a rolling bearing and each type of rolling bearings;

DETAILED DESCRIPTION OF EMBODIMENTS

Hereinafter, with reference to the drawings, a power transmission mechanism in each embodiment of the present disclosure will specifically be described.

1. First Embodiment

Figure 1:
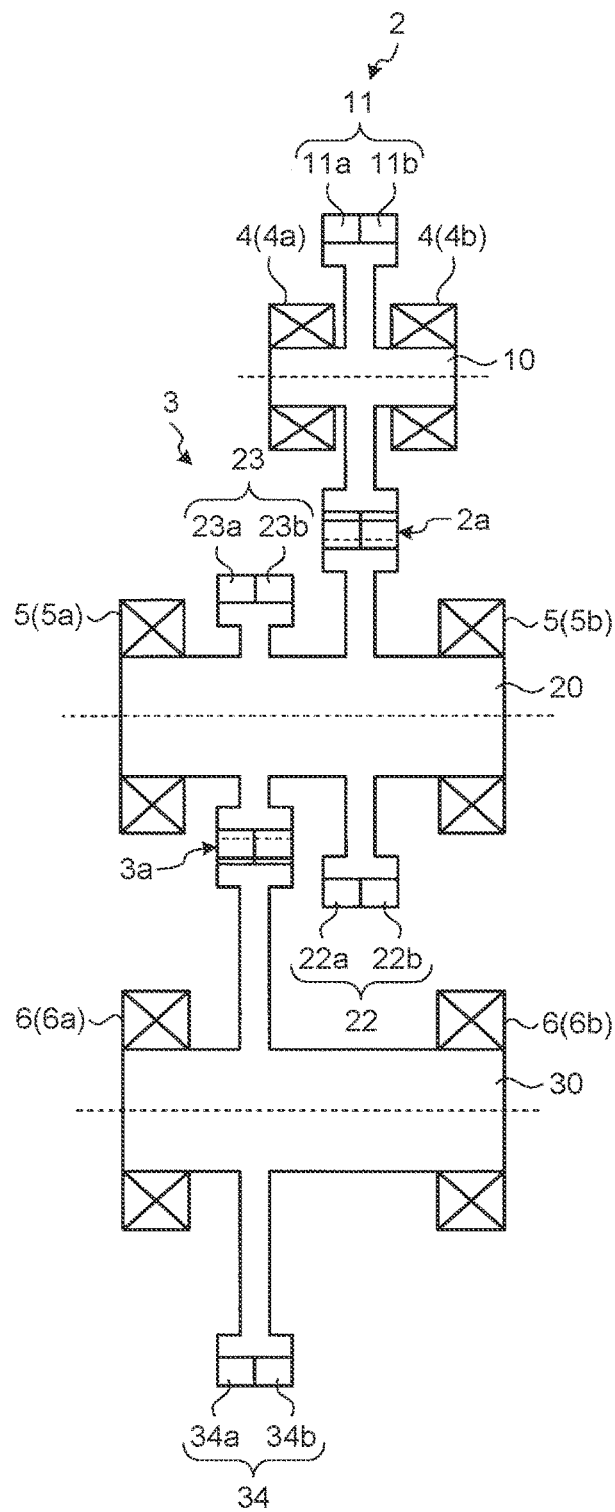
FIG. 1 is a basic configuration view schematically showing a power transmission mechanism of a first embodiment.
Figure 2:
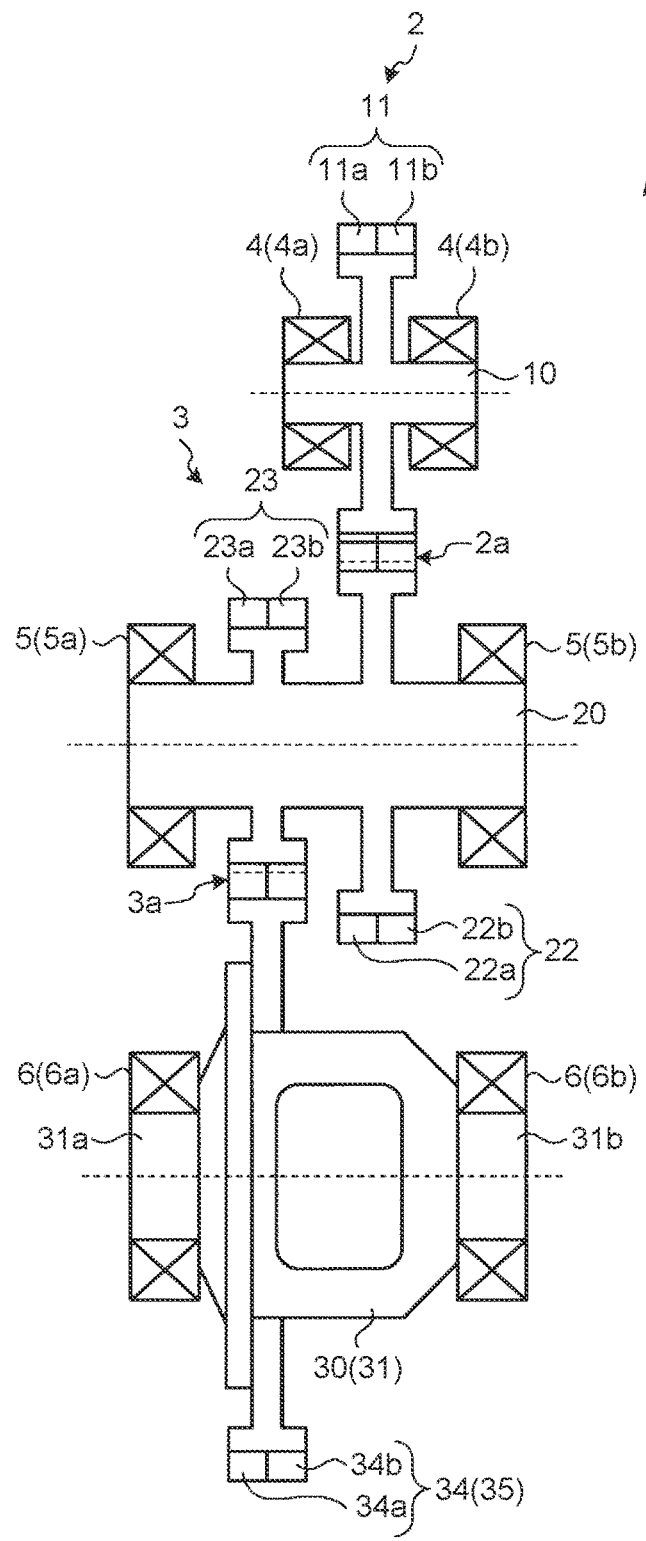
FIG. 2 is a basic configuration view schematically showing a power transmission mechanism having a third shaft composed of a differential case.
Figure 4:
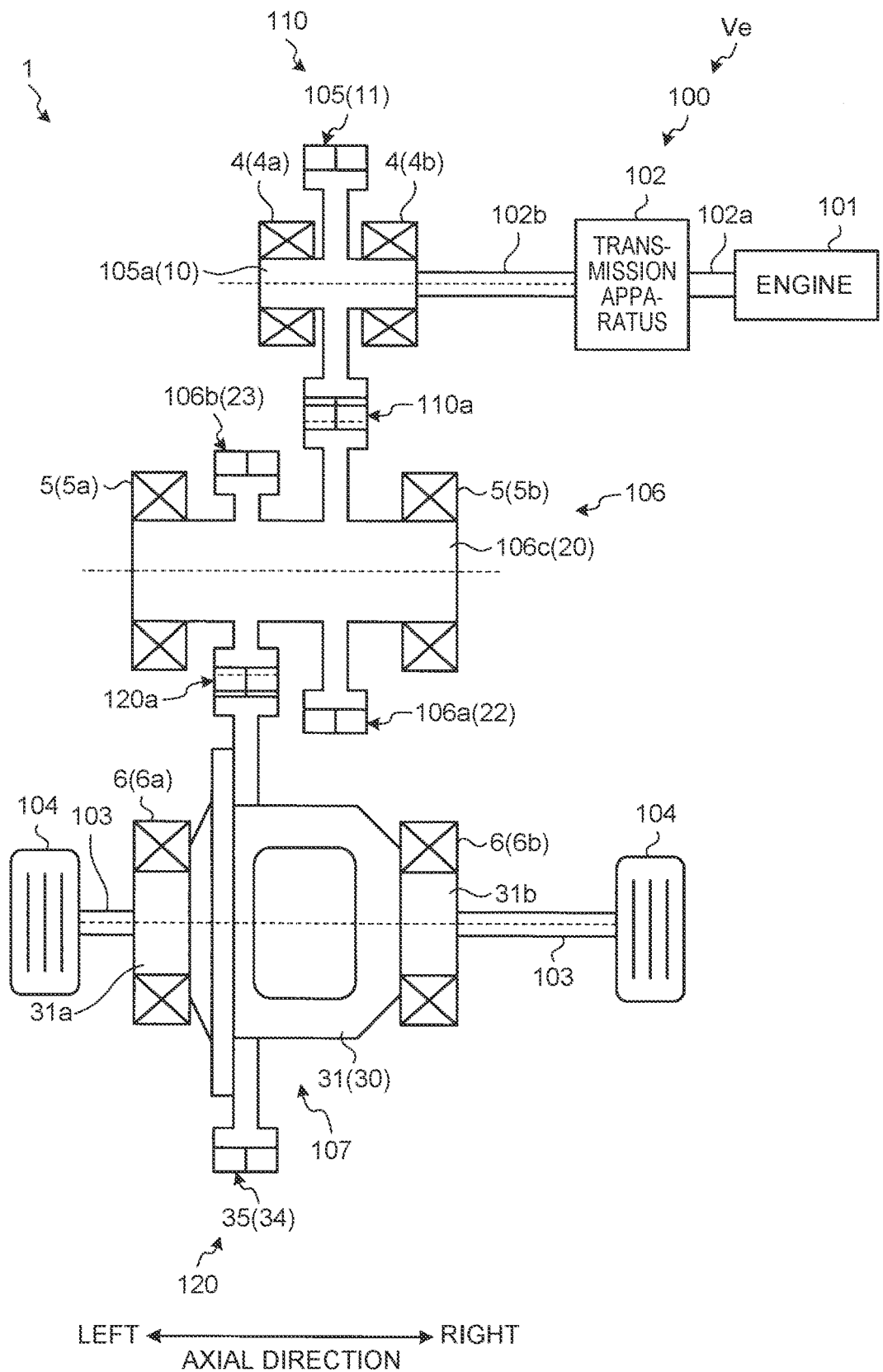
FIG. 4 is a skeleton view schematically showing a first vehicle example including the power transmission mechanism.
Figure 5:
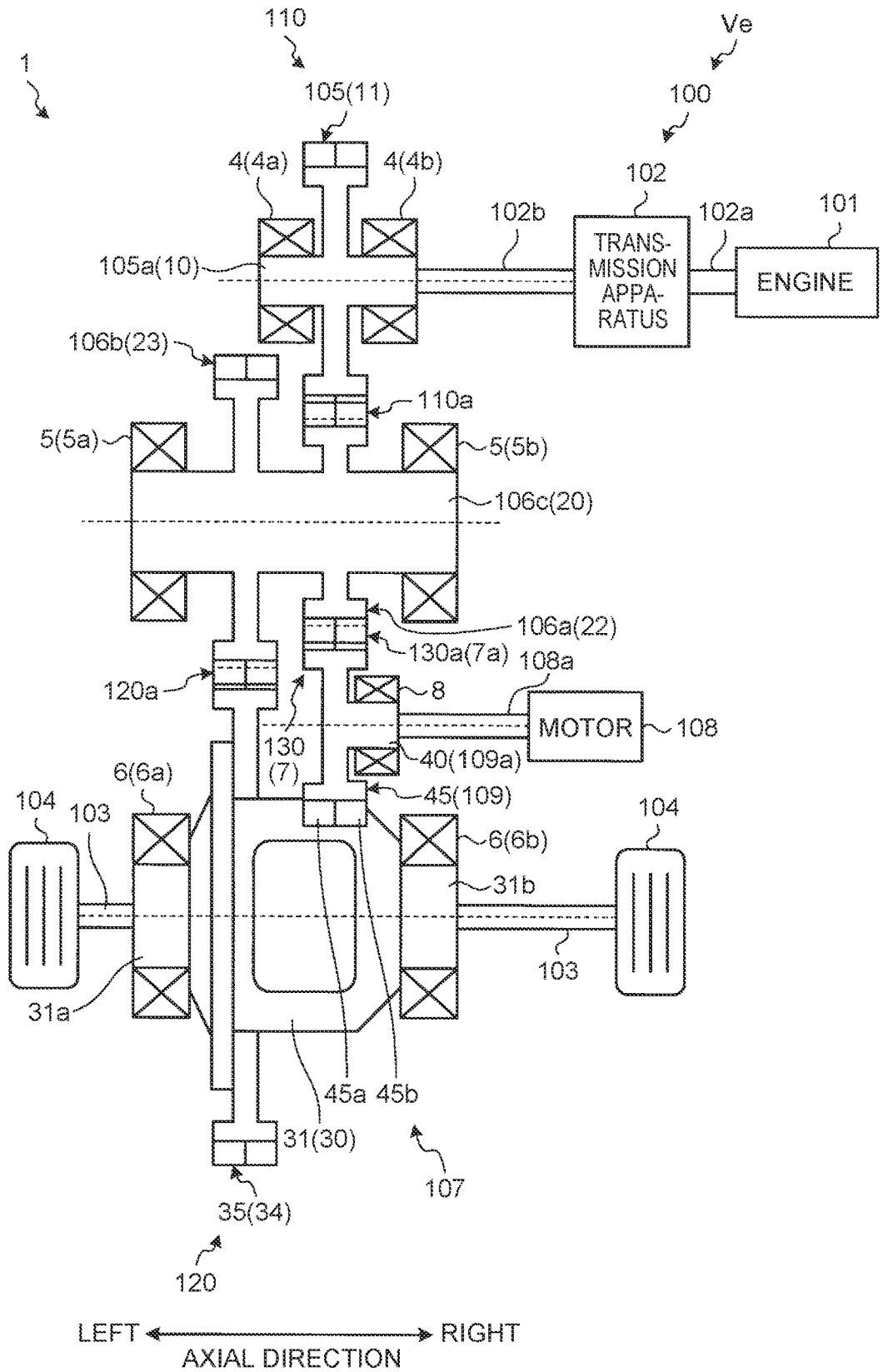
FIG. 5 is a skeleton view schematically showing a second vehicle example including the power transmission mechanism.

With reference to FIGS. 1 to 5, a power transmission mechanism of the first embodiment will be described. FIG. 1 is a basic configuration view schematically showing the power transmission mechanism of the first embodiment. FIG. 2 is a basic configuration view schematically showing the power transmission mechanism including a third shaft composed of a differential case. FIG. 3 is a view explaining a relation between an axial rigidity of a rolling bearing and each type of roller bearings. FIG. 4 is a skeleton view schematically showing a first vehicle example including the power transmission mechanism. FIG. 5 is a skeleton view schematically showing a second vehicle example including the power transmission mechanism.

[1-1. Basic Configuration]

As shown in FIG. 1, the power transmission mechanism 1 includes a first shaft 10, a second shaft 20, and a third shaft 30 as three rotational shafts that are arranged in parallel to one another. The first shaft 10 and the second shaft 20 are coupled to each other via a first gear pair 2 in which double-helical gears mesh with each other so as to transmit motive power. The second shaft 20 and the third shaft 30 are coupled to each other via a second gear pair 3 in which double-helical gears mesh with each other so as to transmit motive power. The motive power of the first shaft 10 is transmitted from the first shaft 10 via the second shaft 20 to the third shaft 30. In this description, an arrangement in the axial direction will be described by using the right side and the left side shown in FIG. 1 in some cases.

In detail, the power transmission mechanism 1 includes: the first shaft 10 including a first double-helical gear 11; the second shaft 20 including a second double-helical gear 22 meshing with the first double-helical gear 11; a third double-helical gear 23 arranged adjacent to the second double-helical gear 22 in the axial direction on the second shaft 20; and the third shaft 30 including a fourth double-helical gear 34 meshing with the third double-helical gear 23.

The first gear pair 2 is composed of the first double-helical gear 11 as a drive gear and the second double-helical gear 22 as a driven gear. At a meshing part 2a of the first gear pair 2, a left tooth flank 11a of the first double-helical gear 11 meshes with a left tooth flank 22a of the second double-helical gear 22, and a right tooth flank 11b of the first double-helical gear 11 meshes with a right tooth flank 22b of the second double-helical gear 22.

The first double-helical gear 11 is a gear (double-helical gear) including the left tooth flank 11a and the right tooth flank 11b that have opposite helical directions to each other. The first double-helical gear 11 and the first shaft 10 are integrally formed. Hence, the first double-helical gear 11 integrally rotates with the first shaft 10 and also integrally moves with the first shaft 10 in the axial direction.

The second double-helical gear 22 is a gear (double-helical gear) including the left tooth flank 22a and the right tooth flank 22b that have opposite helical directions to each other. The second double-helical gear 22 and the second shaft 20 are integrally formed. Hence, the second double-helical gear 22 integrally rotates with the second shaft 20 and also integrally moves with the second shaft 20 in the axial direction. For example, the second double-helical gear 22 is a different body from the second shaft 20, and an inner circumferential part of the second double-helical gear 22 is spline-fitted to an outer circumferential part of the second shaft 20. Through this fitting, the second double-helical gear 22 is integrated with the second shaft 20 so as not to be movable in the axial direction relative to the second shaft 20.

The second gear pair 3 is composed of the third double-helical gear 23 as a drive gear and the fourth double-helical gear 34 as a driven gear. At a meshing part 3a of the second gear pair 3, a left tooth flank 23a of the third double-helical gear 23 meshes with a left tooth flank 34a of the fourth double-helical gear 34, and a right tooth flank 23b of the third double-helical gear 23 meshes with a right tooth flank 34b of the fourth double-helical gear 34.

The third double-helical gear 23 is a gear (double-helical gear) including the left tooth flank 23a and the right tooth flank 23b that have opposite helical directions to each other. The third double-helical gear 23 and the second shaft 20 are integrally formed. Hence, the third double-helical gear 23 integrally rotates with the second shaft 20, and also integrally moves with the second shaft 20 in the axial direction. For example, the left tooth flank 23a and the right tooth flank 23b are formed on the outer circumferential part of the second shaft 20. As described above, the second shaft 20 is a rotational shaft integrally rotating with the second double-helical gear 22 and the third double-helical gear 23, that is, a gear shaft meshing with multiple double-helical gears (the first double-helical gear 11 and the fourth double-helical gear 34).

The fourth double-helical gear 34 is a gear (double-helical gear) including the left tooth flank 34a and the right tooth flank 34b that have opposite helical directions to each other. The fourth double-helical gear 34 and the third shaft 30 are integrally formed. Hence, the fourth double-helical gear 34 integrally rotates with the third shaft 30 and also integrally moves with the third shaft 30 in the axial direction. For example, the fourth double-helical gear 34 is a different body from the third shaft 30, and an inner circumferential part of the fourth double-helical gear 34 is spline-fitted to an outer circumferential part of the third shaft 30. Through this fitting, the fourth double-helical gear 34 is integrated with the third shaft 30 so as not to be movable in the axial direction relative to the third shaft 30.

As described above, each of the first shaft 10 and the third shaft 30 is a rotational shaft including a single double-helical gear (a gear shaft meshing with a single double-helical gear provided on a different shaft). In the meantime, the second shaft 20 as an intermediate shaft is a rotational shaft including two double-helical gears (a gear shaft meshing with multiple double-helical gears provided on different shafts).

The power transmission mechanism 1 includes: a first bearing 4 rotatably supporting the first shaft 10; a second bearing 5 rotatably supporting the second shaft 20; and a third bearing 6 rotatably supporting the third shaft 30. Each of the first to the third bearings 4, 5, 6 is composed of a rolling bearing.

The first bearing 4 is a bearing supporting the first double-helical gear 11. The first bearing 4 includes two bearings 4a, 4b fixed at both axial ends of the first shaft 10. Each of the bearings 4a, 4b is composed of a cylindrical roller bearing. The first shaft 10 and the first double-helical gear 11 are supported by a bearing pair (a first bearing pair) composed of two cylindrical roller bearings.

The second bearing 5 is a bearing supporting the second double-helical gear 22 and the third double-helical gear 23. The second bearing 5 includes two bearings 5a, 5b fixed at both axial ends of the second shaft 20. Each of the bearings 5a, 5b is composed of a taper roller bearing. That is, the second shaft 20, the second double-helical gear 22, and the third double-helical gear 23 are supported by a bearing pair (a second bearing pair) composed of two taper roller bearings.

The third bearing 6 is a bearing supporting the fourth double-helical gear 34. The third bearing 6 includes two bearings 6a, 6b fixed at both axial ends of the third shaft 30. Each of the bearings 6a, 6b is composed of a cylindrical roller bearing. That is, the third shaft 30 and the fourth double-helical gear 34 are supported by a bearing pair (a third bearing pair) composed of two cylindrical roller bearings.

In the first gear pair 2 where the double-helical gears mesh with each other, due to an error component (mesh deviation) at the meshing part 2a, the left and the right tooth flanks 11a, 11b of the first double-helical gear 11 and the left and the right tooth flanks 22a, 22b of the second double-helical gear 22 come into a single-flank contact with each other. For example, if the left tooth flank 11a is in contact with the left tooth flank 22a but the right tooth flank 11b is out of contact with the right tooth flank 22b, a force in the axial direction (a thrust force) acting on the left side in the axial direction is generated at the meshing part 2a. This means, when thrust forces acting on the respective opposite side in the axial direction become imbalance, a thrust force (a driving force) moving the double-helical gear in the axial direction is generated. When the first double-helical gear 11 or the second double-helical gear 22 moves to the left side in the axial direction by the thrust force (the driving force) on the left side in the axial direction, an aligning effect acts such that the right tooth flanks 11b and 22b out of contact from each other come into contact and double-flank contact with each other. In this double-flank contact state, the thrust force on the left side in the axial direction generated by the contact between the left tooth flanks 11a and 22a, and the thrust force on the right side in the axial direction generated by the contact between the right tooth flanks 11b and 22b offset each other. This means that the thrust forces acting on the respective opposite sides in the axial direction are balanced at the meshing part 2a. In this balancing state, the first double-helical gear 11 and the second double-helical gear 22 do not move in the axial direction.

In the second gear pair 3 where the double-helical gears mesh with each other, the left and the right tooth flanks 23a and 23b of the third double-helical gear 23 and the left and the right tooth flanks 34a and 34b of the fourth double-helical gear 34 come into a single-flank contact with each other due to the error component (mesh deviation) at the meshing part 3a. For example, if the left tooth flank 23a is in contact with the left tooth flank 34a but the right tooth flank 23b is out of contact with the right tooth flank 34b, a thrust force (a driving force) acting on the left side in the axial direction is generated at the meshing part 3a. When the third double-helical gear 23 or the fourth double-helical gear 34 moves to the left side in the axial direction by this thrust force (the driving force) on the left side in the axial direction, the aligning effect acts such that the right tooth flanks 23b and 34b out of contact from each other come into contact and double-flank contact with each other. In this double-flank contact state, the thrust force on the left side in the axial direction generated by the contact between the left tooth flanks 23a and 34a, and the thrust force on the right side in the axial direction generated by the contact between the right tooth flanks 23b and 34b offset each other. This means that the thrust forces acting on the respective opposite sides in the axial direction are balanced at the meshing part 3a. In this balancing state, the third double-helical gear 23 and the fourth double-helical gear 34 do not move in the axial direction.

Each of the first shaft 10, the second shaft 20, and the third shaft 30 may be any rotary member as far as this shaft is a rotary member integrally formed with a double-helical gear or gears. This means that each of the rotary shafts (gear shafts) is a rotary member to which a rolling bearing is fixed, and includes a boss integrated with the double-helical gear, a differential case of a differential mechanism installed in a vehicle, and others. For example, the third shaft 30 may be a differential case of the differential mechanism. One example of the power transmission mechanism 1 in which the third shaft 30 is a differential case is shown in FIG. 2.

The power transmission mechanism 1 shown in FIG. 2 includes: a differential case 31 that is the third shaft 30; a differential ring gear 35 that is the fourth double-helical gear 34; and the third bearing 6 rotatably supporting the differential case 31. The differential ring gear 35 is integrated with the differential case 31. The bearings 6a, 6b of the third bearing 6 are fixed to left and right inboard portions 31a, 31b of the differential case 31. In this manner, part of the differential mechanism installed in the vehicle can be composed of the third shaft 30 and the fourth double-helical gear 34. The power transmission mechanism 1 is applicable to a driving unit 100 (shown in FIG. 4) installed in the vehicle, as described later.

In the above-configured power transmission mechanism 1, when the motive power of the first shaft 10 is transmitted to the third shaft 30, a thrust force generated at the meshing part 2a of the first gear pair 2 is received by the first bearing 4 and the second bearing 5, and a thrust force generated at the meshing part 3a of the second gear pair 3 is received by the second bearing 5 and the third bearing 6. That is, the thrust forces act on the second bearing 5 respectively from the multiple meshing parts 2a, 3a.

[1-2. Axial Rigidity]

With reference to FIG. 3, a relation between an axial rigidity of a rolling bearing and each type of rolling bearings will be described. In FIG. 3, four types of rolling bearings: a cylindrical roller bearing, a deep groove ball bearing, an angular contact ball bearing, and a taper roller bearing are exemplified.

Here, the axial rigidity represents a degree of difficulty of axial deformation relative to a force in the axial direction (a thrust force). In addition, a relation of "a rigidity value in the axial direction=a force required for unit deformation in the axial direction (an axial load/an amount of axial deformation)" is satisfied. That is, the axial rigidity of the bearing of interest represents the amount of axial displacement of this bearing. The amount of axial displacement of the bearing of interest represents an amount of movement (amount of axial deformation in the axial direction) of an internal ring (a rotatable bearing ring) of the rolling bearing of interest fixed to the corresponding rotational shaft when this internal ring relatively moves in the axial direction relative to an external ring (a fixed bearing ring) of the rolling bearing of interest in a state in which the external ring is fixed to the case. The axial rigidity of the bearing pair of interest is obtained by synthesizing axial rigidities (summing axial rigidity values) of the two bearings.

As shown in FIG. 3, in rolling bearings, the axial rigidity becomes greater in the order of a cylindrical roller bearing, a deep groove ball bearing, an angular contact ball bearing, and a taper roller bearing. The taper roller bearing and the angular contact ball bearing are bearings each of which has a contact angle, so that the bearing can receive (support) an axial load. A deep groove ball bearing is a bearing that also has a contact angle, so that the bearing can receive an axial load. In the meantime, a cylindrical roller bearing can receive an axial load depending on the internal structure thereof, but a supportable axial load by this bearing is smaller than that by the taper roller bearing and the angular contact ball bearing. Hence, the cylindrical roller bearing has a smaller axial rigidity compared with that of the taper roller bearing, the angular contact ball bearing, and the deep groove ball bearing. As described above, the axial rigidity becomes greatly different depending on the types of the rolling bearings.

The magnitude relation of the axial rigidities among the four types of rolling bearings shown in FIG. 3 is one example, and is not always limited to this. However, with respect to a relation between a cylindrical roller bearing and a taper roller bearing, the magnitude relation of the axial rigidities shown in FIG. 3 is satisfied.

As aforementioned, the cylindrical roller bearing has a smaller axial rigidity than that of the taper roller bearing; therefore, the second bearing 5 is configured to have a greater axial rigidity than those of the first bearing 4 and the third bearing 6. Through this, on the second shaft 20 that is a gear shaft meshing with the multiple double-helical gears, it is possible to suppress that an axial behavior of the second double-helical gear 22 and an axial behavior of the third double-helical gear 23 interfere with each other, causing mutual hindrance to their aligning effects.

Specifically, in the power transmission mechanism 1, since the double-helical gears and the rotational shafts are integrally formed with each other, the axial rigidity of each bearing represents difficulty of an axial behavior of the double-helical gear relative to the thrust force generated at the meshing part thereof. That is, that the axial rigidity of the bearing of interest is greater indicates that the double-helical gear supported by this bearing is more difficult to move in the axial direction. Since the first bearing 4 has a smaller axial rigidity than that of the second bearing 5, the first double-helical gear 11 more easily moves in the axial direction relative to the thrust force generated at the meshing part 2a than the second double-helical gear 22 does. In addition, since the third bearing 6 has a smaller axial rigidity than that of the second bearing 5, the fourth double-helical gear 34 more easily moves in the axial direction relative to the thrust force generated at the meshing part 3a than the third double-helical gear 23 does.

For example, when the single-flank contact of the double-helical gears is caused at the meshing part 2a of the first gear pair 2, the axial rigidity of the first bearing 4 is smaller than the axial rigidity of the second bearing 5, and thus the first double-helical gear 11 on the first shaft 10 side mainly moves in the axial direction due to the thrust force generated at the meshing part 2a, and the axial behavior of the second double-helical gear 22 on the second shaft 20 side becomes smaller. In this manner, although the second double-helical gear 22 does not actively move in the axial direction due to an error component at the meshing part 2a, the aligning effect of the first gear pair 2 is exerted due to the axial behavior of the first double-helical gear 11.

When the single-flank contact of the double-helical gears is caused at the meshing part 3a of the second gear pair 3, the axial rigidity of the third bearing 6 is smaller than the axial rigidity of the second bearing 5, and thus the fourth double-helical gear 34 on the third shaft 30 side mainly moves in the axial direction due to the thrust force generated at the meshing part 3a, and the axial behavior of the third double-helical gear 23 on the second shaft 20 side becomes smaller. In this manner, although the third double-helical gear 23 does not actively move in the axial direction due to an error component at the meshing part 3a, the aligning effect of the second gear pair 3 is exerted due to the axial behavior of the fourth double-helical gear 34.

[1-3. Vehicle Examples]

[1-3-1. First Vehicle Example]

As shown in FIG. 4, the driving unit 100 of a vehicle Ve as a first vehicle example includes: an engine 101 as a traveling power source; and the power transmission mechanism 1 whose third shaft 30 is the differential case 31. Motive power outputted from the engine 101 is transmitted via a transmission apparatus 102, the power transmission mechanism 1, and axles 103 to driven wheels 104. The power transmission mechanism 1 is composed of an output gear 105, a counter gear mechanism 106, and a differential mechanism 107. In description of the vehicle Ve, description of the same configurations as those of the above-described power transmission mechanism 1 will be omitted, and the reference numerals thereof will be used.

First, an output shaft of the engine 101 is coupled to an input shaft 102a of the transmission apparatus 102. The motive power outputted from the engine 101 is inputted from the input shaft 102a to the transmission apparatus 102. The transmission apparatus 102 is composed of a known transmission mechanism. An example of the transmission apparatus 102 may include an automatic transmission that includes: a first planetary gear mechanism of single-pinion type; a second planetary gear mechanism of Ravigneaux type having four rotary elements; and an engagement unit for transmission composed of multiple clutches and brakes. The motive power whose speed is changed in the transmission apparatus 102 is inputted from an output shaft 102b of the transmission apparatus 102 to the power transmission mechanism 1.

Next, the output gear 105 is the first double-helical gear 11 that outputs the motive power of the output shaft 102b of the transmission apparatus 102 toward the driven wheels 104. The output gear 105 is integrally formed with a transmission shaft 105a that is the first shaft 10. Since the transmission shaft 105a is spline-fitted to an outer circumferential part of the output shaft 102b, the output shaft 102b, the transmission shaft 105a, and the output gear 105 integrally rotate. In this case, at the spline-fitted part between the transmission shaft 105a and the output shaft 102b, the transmission shaft 105a is configured to be relatively movable with respect to the output shaft 102b. In addition, the transmission shaft 105a is rotatably supported by the first bearing 4 relative to a fixed member (not illustrated) such as a case. An internal ring of the first bearing 4 is fixed to an outer circumferential part of the transmission shaft 105a, and an external ring of the first bearing 4 is fixed to the case. The two bearings 4a, 4b are fixed at both axial ends of the transmission shaft 105a.

The output gear 105 meshes with a counter driven gear 106a that is the second double-helical gear 22. A counter gear pair 110 that is the first gear pair 2 is composed of the output gear 105 and a drive pinion gear 106b.

The counter gear mechanism 106 includes: the counter driven gear 106a that is the second double-helical gear 22; the drive pinion gear 106b that is the third double-helical gear 23; and a counter shaft 106c that is the second shaft 20. The counter shaft 106c is arranged in parallel to the output shaft 102b. The counter driven gear 106a and the drive pinion gear 106b that are disposed adjacent to each other on the counter shaft 106c integrally rotate with each other. In addition, the counter shaft 106c is rotatably supported by the second bearing 5 relative to a fixed member such as the case (not illustrated). An internal ring of the second bearing 5 is fixed to an outer circumferential part of the counter shaft 106c, and an external ring of the second bearing 5 is fixed to the case. The two bearings 5a, 5b are fixed at both axial ends of the counter shaft 106c.

The drive pinion gear 106b meshes with the differential ring gear 35 that is the fourth double-helical gear 34. A final gear pair 120 that is the second gear pair 3 is composed of the drive pinion gear 106b and the differential ring gear 35.

In this manner, the counter gear mechanism 106 is a double-helical gear unit in which two double-helical gears (the counter driven gear 106a, the drive pinion gear 106b) integrally rotating are provided on a single rotary shaft (the counter shaft 106c). The counter driven gear 106a and the drive pinion gear 106b mesh with the double-helical gears (the output gear 105, the differential ring gear 35) provided on different shafts (the transmission shaft 105a, the differential case 31).

The differential mechanism 107 includes: the differential ring gear 35 that is the fourth double-helical gear 34; the differential case 31 that is the third shaft 30; and a differential pinion gear and a differential side gear that are not illustrated. The differential case 31 is rotatably supported by the third bearing 6 relative to a fixed member such as the case (not illustrated). The internal ring of the third bearing 6 is fixed to the inboard portions 31a, 31b of the differential case 31, and an external ring of the third bearing 6 is fixed to the case. That is, the two bearings 6a, 6b are fixed at the axial ends of the differential case 31, that is, the left and the right inboard portions 31a, 31b of the differential case 31.

The left and the right driven wheels 104, 104 are coupled via the left and the right axles 103, 103 to the differential mechanism 107. Respective rotational centers of the differential case 31 and the differential ring gear 35 are provided on the same axis as the rotational center axis of the axles 103. The axles 103 are arranged in parallel to the transmission shaft 105a and the counter shaft 106c.

In the above-configured driving unit 100, when the motive power of the engine 101 is transmitted to the driven wheels 104, the thrust force generated at a meshing part 110a of the counter gear pair 110 is received by the first bearing 4 and the second bearing 5, and the thrust force generated at a meshing part 120a of the final gear pair 120 is received by the second bearing 5 and the third bearing 6. Since the axial rigidity of the first bearing 4 is smaller than that of the second bearing 5, the output gear 105 more easily moves in the axial direction relative to a thrust force generated at the meshing part 110a of the counter gear pair 110 than the counter driven gear 106a does. In addition, since the axial rigidity of the third bearing 6 is smaller than that of the second bearing 5, the differential ring gear 35 more easily moves in the axial direction relative to a thrust force generated at the meshing part 120a of the final gear pair 120 than the drive pinion gear 106b does. That is, the axial behavior of the counter driven gear 106a relative to the thrust force of the counter gear pair 110 becomes smaller, and the axial behavior of the drive pinion gear 106b relative to the thrust force of the final gear pair 120 becomes smaller. Through this, it is possible to suppress that the axial behavior of the counter driven gear 106a and the axial behavior of the drive pinion gear 106*b* interfere with each other on the counter shaft 106*c*, causing mutual hindrance to their aligning effects.

[1-3-2. Second Vehicle Example]

First, the power transmission mechanism 1 installed in the vehicle Ve shown in FIG. 5 will be described. Different from the above-described configuration, this power transmission mechanism 1 includes: a fourth shaft 40 having a fifth double-helical gear 45 meshing with the second double-helical gear 22; and a fourth bearing 8 rotatably supporting the fourth shaft 40.

The fourth shaft 40 is arranged in parallel to the first to the third shafts 10, 20, 30. The fourth shaft 40 and the second shaft 20 are coupled so as to transmit motive power by a third gear pair 7 where the double-helical gears mesh with each other. The motive power of the fourth shaft 40 is transmitted from the fourth shaft 40 via the second shaft 20 to the third shaft 30.

The third gear pair 7 is composed of the fifth double-helical gear 45 as the drive gear and the second double-helical gear 22 as the driven gear. At a meshing part a of the third gear pair 7, a left tooth flank 45*a* of the fifth double-helical gear 45 meshes with the left tooth flank 22*a* of the second double-helical gear 22, and a right tooth flank 45*b* of the fifth double-helical gear 45 meshes with the right tooth flank 22*b* of the second double-helical gear 22.

The fifth double-helical gear 45 is a gear (double-helical gear) including the left tooth flank 45*a* and the right tooth flank 45*b* that have opposite helical directions to each other. The fifth double-helical gear 45 and the fourth shaft 40 are integrally formed. Hence, the fifth double-helical gear 45 integrally rotates with the fourth shaft 40, and also integrally moves with the fourth shaft 40 in the axial direction.

The fourth bearing 8 is a rolling bearing supporting the fifth double-helical gear 45. For example, the fourth bearing 8 is a cylindrical roller bearing, and is fixed to one axial end of the fourth shaft 40. The fourth shaft 40 and the fifth double-helical gear 45 are supported by the single cylindrical roller bearing.

In the above-configured power transmission mechanism 1, when the motive power of the fourth shaft 40 is transmitted to the third shaft 30, a thrust force generated at the meshing part 7*a* of the third gear pair 7 is received by the fourth bearing 8 and the second bearing 5. As aforementioned, the cylindrical roller bearing has a smaller axial rigidity than that of the taper roller bearing; therefore, the fourth bearing 8 has a smaller axial rigidity than that of the second bearing 5. Hence, the fifth double-helical gear 45 more easily moves in the axial direction relative to the thrust force generated at the meshing part 7*a* of the third gear pair 7 than the second double-helical gear 22 does.

For example, when the single-flank contact is caused at the meshing part 7*a* of the third gear pair 7, the fourth bearing 8 has a smaller axial rigidity than that of the second bearing 5, and thus the fifth double-helical gear 45 on the fourth shaft 40 side mainly moves in the axial direction by the thrust force generated at the meshing part 7*a*, and the axial behavior of the second double-helical gear 22 on the second shaft 20 becomes smaller. In this manner, even if the second double-helical gear 22 does not move in the axial direction due to the error component at the meshing part 7*a*, the aligning effect of the third gear pair 7 is exerted due to the axial behavior of the fifth double-helical gear 45.

Next, the driving unit 100 of the vehicle Ve shown in FIG. 5 will be described. This driving unit 100 is a hybrid vehicle provided with a motor 108 as a traveling power source, and the power transmission mechanism 1 including the fourth shaft 40. The motor 108 is a known motor generator functioning as an electric motor and an electric power generator. A motor shaft 108*a* that is an output shaft of the motor 108 is arranged in parallel to the counter shaft 106*c*, and also integrally rotates with a reduction gear 109.

The reduction gear 109 is the fifth double-helical gear 45 outputting the motive power of the motor shaft 108*a* toward the driven wheels 104. The reduction gear 109 is integrally formed with a support shaft 109*a* that is the fourth shaft 40. Since the support shaft 109*a* is spline-fitted to an outer circumferential part of the motor shaft 108*a*, the motor shaft 108*a*, the support shaft 109*a*, and the reduction gear 109 integrally rotate. In this case, at the spline-fitted part between the support shaft 109*a* and the motor shaft 108*a*, the support shaft 109*a* is configured to be relatively movable in the axial direction with respect to the motor shaft 108*a*. The support shaft 109*a* is rotatably supported by the fourth bearing 8 relative to a fixed member such as the case (not illustrated). An internal ring of the fourth bearing 8 is fixed to an outer circumferential part of the support shaft 109*a*, and an external ring of the fourth bearing 8 is fixed to the case. In the example shown in FIG. 5, the support shaft 109*a* is supported by the single fourth bearing 8 in a cantilever state.

The reduction gear 109 meshes with the counter driven gear 106*a* that is the second double-helical gear 22. A reduction gear pair 130 that is the third gear pair 7 is composed of the reduction gear 109 and the counter driven gear 106*a*.

When the motive power of the motor 108 is transmitted to the driven wheels 104, the thrust force generated at a meshing part 130*a* of the reduction gear pair 130 is received by the fourth bearing 8 and the second bearing 5.

In addition, since the axial rigidity of the fourth bearing 8 is smaller than the axial rigidity of the second bearing 5, the reduction gear 109 more easily moves in the axial direction relative to a thrust force generated at the meshing part 130*a* of the reduction gear pair 130 than the counter driven gear 106*a* does. That is, the axial behavior of the counter driven gear 106*a* relative to the thrust force at the reduction gear pair 130 becomes smaller. Through this, on the counter shaft 106*c*, it is suppressed that the axial behavior of the counter driven gear 106*a* and the axial behavior of the drive pinion gear 106*b* interfere with each other, causing mutual hindrance to their aligning effects.

As aforementioned, according to the first embodiment, since the second bearing 5 has a greater axial rigidity than that of the first bearing 4 and the third bearing 6, the aligning effects of the first gear pair 2 and the second gear pair 3 are suppressed from being mutually hindered on the second shaft 20. Through this, it is possible to suppress the axial behaviors of the double-helical gears from interfering with each other on the gear shaft meshing with the multiple double-helical gears, to thereby secure mutual aligning effects thereof. Accordingly, the aligning effects of the double-helical gears properly work, so that generation of noises and vibrations can be suppressed at the meshing part.

In the case of the power transmission mechanism 1 including the fourth shaft 40, since the second bearing 5 has a greater axial rigidity than that of the fourth bearing 8, it is possible to suppress the first gear pair 2, the second gear pair 3, and the third gear pair 7 from mutually hindering their aligning effects on the second shaft 20. Accordingly, even if the multiple double-helical gears mesh with the single double-helical gear, the aligning effects of the double-helical gears properly work, thus to suppress generation of noises and vibrations.

The present disclosure is not limited to the aforementioned first embodiment, and may appropriately be modified without departing from the scope of the disclosure.

For example, the second bearing 5 may have a greater axial rigidity than that of at least one of the first bearing 4 and the third bearing 6.

As one example, the second bearing 5 may have a greater axial rigidity than that of the first bearing 4, and may also have an axial rigidity smaller than or equal to that of the third bearing 6. In this case, the axial rigidity becomes smaller in the order of "the third bearing 6≥the second bearing 5>the first bearing 4". Through this, the aligning effect of the first gear pair 2 is secured not by the axial behavior of the second double-helical gear 22, but by the axial behavior of the first double-helical gear 11. That is, it is possible to suppress the second double-helical gear 22 from moving in the axial direction so as to exert the aligning effect of the first gear pair 2. Hence, even if the third double-helical gear 23 moves in the axial direction so as to exert the aligning effect of the second gear pair 3, it is possible to suppress the axial behavior of the third double-helical gear 23 from being subjected to interference of the axial behavior of the second double-helical gear 22. In this manner, it is possible to suppress the aligning effect of the first gear pair 2 and the aligning effect of the second gear pair 3 from being mutually hindered on the second shaft 20.

As another example, the second bearing 5 may have an axial rigidity greater than that of the third bearing 6, and may also have an axial rigidity smaller than or equal to that of the first bearing 4. In this case, the axial rigidity becomes smaller in the order of "the first bearing 4≥the second bearing 5>the third bearing 6". Through this, the aligning effect of the second gear pair 3 is secured not by the axial behavior of the third double-helical gear 23, but by the axial behavior of the fourth double-helical gear 34. That is, it is possible to suppress the third double-helical gear 23 from moving in the axial direction so as to exert the aligning effect of the second gear pair 3. Hence, although the second double-helical gear 22 moves in the axial direction so as to exert the aligning effect of the first gear pair 2, it is possible to suppress the axial behavior of the second double-helical gear 22 from being subjected to interference of the axial behavior of the third double-helical gear 23. In this manner, it is possible to suppress the aligning effect of the first gear pair 2 and the aligning effect of the second gear pair 3 from being mutually hindered on the second shaft 20.

The second bearing 5 may be composed of a rolling bearing of a different type from that of at least one of the first bearing 4 and the third bearing 6. For example, as one example in which the aforementioned axial rigidity becomes smaller in the order of "the third bearing 6≥the second bearing 5>the first bearing 4", if the second bearing 5 is a taper roller bearing, the first bearing 4 may be a cylindrical roller bearing, and the third bearing 6 may be a taper roller bearing. As one example in which the aforementioned axial rigidity becomes smaller in the order of "the first bearing 4≥the second bearing 5>the third bearing 6", if the second bearing 5 is a taper roller bearing, the first bearing 4 may be a taper roller bearing, and the third bearing 6 may be a cylindrical roller bearing.

In addition, the types of the first to the third bearings 4, 5, 6 are not limited to the above combination of two types: a cylindrical roller bearing and a taper roller bearing. For example, the four types of rolling bearings shown in FIG. 3 may appropriately be combined. That is, roller bearings and ball bearings may be combined for the first to the third bearings 4, 5, 6. If the second bearing 5 is a taper roller bearing, each of the first bearing 4 and the third bearing 6 may be composed of any one of a cylindrical roller bearing, a deep groove ball bearing, and an angular contact ball bearing. Hence, the first bearing 4 may be a deep groove ball bearing, the second bearing 5 may be a taper roller bearing, and the third bearing 6 may be a deep groove ball bearing. The second bearing 5 may be composed of a bearing of a different type from that of the fourth bearing 8.

Moreover, the number of each of the first to the third bearings 4, 5, 6 is not limited to two, and may be one. This means that the first double-helical gear 11 may be supported by the first bearing 4 composed of a single bearing in a cantilever state. Similarly, the second double-helical gear 22 and the third double-helical gear 23 may be supported by the second bearing 5 composed of a single bearing in a cantilever state, and the fourth double-helical gear 34 may be supported by the third bearing 6 composed of a single bearing in a cantilever state. Hence, each of the first to the third bearings 4, 5, 6 may be composed of one bearing or two bearings, and may appropriately be combined to one another. As one example, the first bearing 4 is composed of the single bearing 4a, the second bearing 5 is composed of the two bearings 5a, 5b, and the third bearing 6 is composed of the two bearings 6a, 6b. As another example, each of the bearings 4, 5, 6 may be composed of a single bearing. That is, when the first bearing 4 is described, the following cases are included: the case in which the first bearing 4 is composed of the bearing 4a alone, the case in which the first bearing 4 is composed of the bearing 4b alone, and the case in which the first bearing 4 is composed of the two bearings 4a, 4b. This is the same in the second bearing 5 and the third bearing 6.

Each of the first to the fourth bearings 4, 5, 6, 8 may be a single-row bearing or a double-row bearing.

Each of the first to the third shafts 10, 20, 30 and each of the first to the fourth double-helical gears 11, 22, 23, 34 may not be limited to being composed of a single member or different members. For example, if they are different members from each other, it may be configured that the double-helical gears and the corresponding rotational shafts are integrated in a manner as to be integrally rotatable and relatively immovable in the axial direction. That is, description that the double-helical gears and the rotational shafts are integrally formed means that the double-helical gears and the rotational shafts integrally rotate and also integrally move in the axial direction.

Each of the above vehicle examples shown in FIG. 4 and FIG. 5 are one example, and an applicable vehicle is not limited to these examples. For example, the transmission apparatus 102 is not limited to an automatic transmission, and may also be a belt-type continuously variable transmission (CVT). A hybrid vehicle to which the power transmission mechanism 1 is applicable is not limited to a single-motor-type hybrid vehicle, and a double-motor-type hybrid vehicle may also be included. If the power transmission mechanism 1 shown in FIG. 5 is installed in a double-motor-type hybrid vehicle, the driving unit 100 further includes a not-illustrated first motor, and the motor 108 functions as a second motor. In this case, the motive power outputted from the first motor is transmitted via the output gear 105 to the driven wheels 104.

2. Second Embodiment

With reference to FIG. 1 and FIG. 2, and FIG. 4 to FIG. 6, a power transmission mechanism of the second embodiment will be described. FIG. 6 is a view explaining a relation between an axial internal gap of a roller bearing and each type of rolling bearing. In the description of the second embodiment, description of the same configurations as those of the first embodiment will be omitted, and the reference numerals thereof will be used.

[2-1. Basic Configuration of Second Embodiment]

First, the power transmission mechanism 1 of the second embodiment will be described with reference to FIG. 1 and FIG. 2. In the power transmission mechanism 1 of the second embodiment, the first bearing 4 and the third bearing 6 are composed of ball bearings, which is different from the first embodiment.

Each of the bearings 4a, 4b of the first bearing 4 is composed of a deep groove ball bearing. The first shaft 10 and the first double-helical gear 11 are supported by a bearing pair (the first bearing pair) composed of two deep groove ball bearings. Each of the bearings 6a, 6b of the third bearing 6 is composed of a deep groove ball bearing. The third shaft 30 and the fourth double-helical gear 34 are supported by a bearing pair (the third bearing pair) composed of two deep groove ball bearings.

In the second embodiment, with respect to the axial internal gaps of the roller bearings, it is configured that the axial internal gap of the bearing supporting the rotational shaft (the intermediate shaft) having the multiple double-helical gears is different from the axial internal gap of the bearing supporting the rotational shaft having the single double-helical gear.

Here, the axial internal gap of the roller bearing denotes an amount of movement in the axial direction of one bearing ring of the internal ring and the external ring with the other bearing ring of the internal ring and the external ring fixed. This means that the axial internal gap of the rolling bearing of interest represents an amount of axial displacement (movable amount) of this bearing.

[2-2. Axial Internal Gap]

Next, with reference to FIG. 6, a relation between an axial internal gap of a rolling bearing and each type of rolling bearings will be described. In FIG. 6, as the rolling bearings, four types of rolling bearings: a cylindrical roller bearing, a deep groove ball bearing, a taper roller bearing, and an angular contact ball bearing are exemplified. In the following description, the "axial internal gap of the rolling bearing" is referred to simply as the "axial internal gap".

As shown in FIG. 6, in rolling bearings, the axial internal gap becomes smaller in the order of a cylindrical roller bearing, a deep groove ball bearing, a taper roller bearing, and an angular contact ball bearing. Since pre-compression is applied to the taper roller bearing and the angular contact ball bearing, each of these bearings has substantially no axial internal gap. The deep groove ball bearing is a bearing having a contact angle, and has a greater axial internal gap than that of a taper roller bearing and an angular contact ball bearing. The cylindrical roller bearing has a relatively greatest axial internal gap. As described above, the axial internal gap is different depending on the type of the rolling bearing.

The magnitude relation of the axial internal gaps among the four types of rolling bearings shown in FIG. 6 is merely one example, and the present disclosure is not limited to this. However, the magnitude relation of the axial internal gaps shown in FIG. 6 is satisfied in the relation between the deep groove ball bearing and the taper roller bearing.

As aforementioned, the deep groove ball bearing has a greater axial internal gap than that of the taper roller bearing, so that the axial internal gap of the second bearing 5 is formed to be smaller than that of the first bearing 4 and the third bearing 6. In the power transmission mechanism 1, the double-helical gears and the rotational shafts are integrally formed; therefore, the axial internal gap of the bearing of interest represents easiness of the axial behavior of the double-helical gear thereof when the thrust force (the driving force) at the meshing part acts.

For example, when the single-flank contact is caused at the meshing part 2a of the first gear pair 2, because the axial internal gap of the first bearing 4 is greater than that of the second bearing 5, the first double-helical gear 11 on the first shaft 10 side moves in the axial direction due to the thrust force generated at the meshing part 2a, and the axial behavior of the second double-helical gear 22 on the second shaft 20 side becomes smaller. In this manner, although the second double-helical gear 22 does not actively move in the axial direction due to the error component at the meshing part 2a, the aligning effect of the first gear pair 2 is exerted due to the axial behavior of the first double-helical gear 11.

When the single-flank contact of the double-helical gears is caused at the meshing part 3a of the second gear pair 3, the axial internal gap of the third bearing 6 is greater than that of the second bearing 5, and thus the fourth double-helical gear 34 on the third shaft 30 moves in the axial direction due to the thrust force generated at the meshing part 3a, and the axial behavior of the third double-helical gear 23 on the second shaft 20 side becomes smaller. In this manner, although the third double-helical gear 23 does not actively move in the axial direction due to the error component at the meshing part 3a, the aligning effect of the second gear pair 3 is exerted due to the axial behavior of the fourth double-helical gear 34.

[2-3. Vehicle Example of Second Embodiment]

The power transmission mechanism 1 of the second embodiment can be installed in the vehicle Ve shown in FIG. 4 and FIG. 5.

In the first vehicle example shown in FIG. 4, since the axial internal gap of the first bearing 4 is greater than that of the second bearing 5, the output gear 105 more easily moves in the axial direction relative to the thrust force generated at the meshing part 110a of the counter gear pair 110 than the counter driven gear 106a does. In addition, since the axial internal gap of the third bearing 6 is greater than that of the second bearing 5, the differential ring gear 35 more easily moves in the axial direction relative to the thrust force generated at the meshing part 120a of the final gear pair 120 than the drive pinion gear 106b does.

In the power transmission mechanism 1 of the second vehicle example shown in FIG. 5, the fourth bearing 8 is composed of a deep groove ball bearing. The fourth shaft 40 and the fifth double-helical gear 45 are supported by a single deep groove ball bearing. Since the axial internal gap of the deep groove ball bearing is greater than that of the taper roller bearing, the axial internal gap of the fourth bearing 8 is formed to be greater than that of the second bearing 5. Hence, the fifth double-helical gear 45 more easily moves in the axial direction relative to the thrust force generated at the meshing part 7a of the third gear pair 7 than the second double-helical gear 22 does.

In the driving unit 100 of the second vehicle example shown in FIG. 5, the axial internal gap of the fourth bearing 8 is greater than that of the second bearing 5, and thus the reduction gear 109 more easily moves in the axial direction relative to the thrust force generated at the meshing part 130a of the reduction gear pair 130 than the counter driven gear 106a does.

As aforementioned, according to the second embodiment, since the axial internal gap of the second bearing 5 is smaller than that of the first bearing 4 and the third bearing 6, the aligning effects of the first gear pair 2 and the second gear pair 3 are suppressed from being mutually hindered on the second shaft 20. Through this, it is possible to suppress the axial behaviors of the double-helical gears from interfering with each other on the gear shaft meshing with the multiple double-helical gears, to thereby secure mutual aligning effects thereof. Accordingly, the aligning effects of the double-helical gears properly work, to thereby suppress generation of noises and vibrations at the meshing part.

The present disclosure is not limited to the aforementioned second embodiment, and may appropriately modified without departing from the scope of the disclosure.

For example, the second bearing 5 may have a smaller axial internal gap than that of at least one of the first bearing 4 and the third bearing 6.

As one example, the axial internal gap of the second bearing 5 may be configured to be smaller than that of the first bearing 4, and also to be greater than or equal to the axial internal gap of the third bearing 6. In this case, the axial internal gap becomes smaller in the order of "the first bearing 4>the second bearing 5≥the third bearing 6". Through this, the aligning effect of the first gear pair 2 is secured not by the axial behavior of the second double-helical gear 22, but by the axial behavior of the first double-helical gear 11. That is, it is possible to suppress the second double-helical gear 22 from moving in the axial direction so as to exert the aligning effect of the first gear pair 2. Hence, even if the third double-helical gear 23 moves in the axial direction so as to exert the aligning effect of the second gear pair 3, the axial behavior of the third double-helical gear 23 is suppressed from being subjected to interference by the axial behavior of the second double-helical gear 22. In this manner, it is possible to suppress the aligning effect of the first gear pair 2 and the aligning effect of the second gear pair 3 from being mutually hindered on the second shaft 20.

As another example, it may be configured that the axial internal gap of the second bearing 5 is smaller than that of the third bearing 6, and is also greater than or equal to the axial internal gap of the first bearing 4. In this case, the axial internal gap becomes smaller in the order of "the third bearing 6>the second bearing 5≥the first bearing 4". Through this, the aligning effect of the second gear pair 3 is secured not by the axial behavior of the third double-helical gear 23, but by the axial behavior of the fourth double-helical gear 34. That is, it is possible to suppress the third double-helical gear 23 from moving in the axial direction so as to exert the aligning effect of the second gear pair 3. Hence, even if the second double-helical gear 22 moves in the axial direction so as to exert the aligning effect of the first gear pair 2, it is possible to suppress the axial behavior of the second double-helical gear 22 from being subjected to interference of the axial behavior of the third double-helical gear 23. In this manner, it is possible to suppress the aligning effect of the first gear pair 2 and the aligning effect of the second gear pair 3 from being mutually hindered on the second shaft 20.

The second bearing 5 may be composed of a rolling bearing of a different type from that of at least one of the first bearing 4 and the third bearing 6. For example, as one example in which the aforementioned axial internal gap becomes smaller in the order of "the first bearing 4>the second bearing 5≥the third bearing 6", if the second bearing 5 is a taper roller bearing, the first bearing 4 may be a deep groove ball bearing, and the third bearing 6 may be a taper roller bearing. As one example of the case in which the aforementioned axial internal gap becomes smaller in the order of "the third bearing 6>the second bearing 5≥the first bearing 4", if the second bearing 5 is a taper roller bearing, the first bearing 4 may be a taper roller bearing, and the third bearing 6 may be a deep groove ball bearing.

In addition, the types of the first to the third bearing 4, 5, 6 are not limited to the combination of the above-described two types: the deep groove ball bearing and the taper roller bearing. For example, the above-described four types of rolling bearings shown in the FIG. 6 may appropriately be combined. The second bearing 5 may be composed of the taper roller bearing or the angular contact ball bearing. In this case, each of the first bearing 4 and the third bearing 6 may be composed of the cylindrical roller bearing or the deep groove ball bearing. Hence, in the second embodiment, the first bearing 4 may be the cylindrical roller bearing, the second bearing 5 may be the taper roller bearing, and the third bearing 6 may be the cylindrical roller bearing.

3. Third Embodiment

Figures 7, 8, 9:
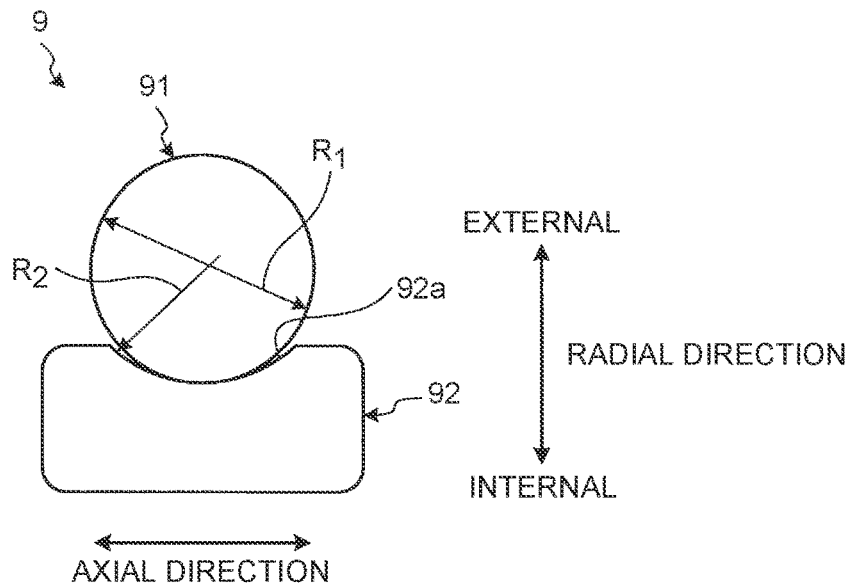
FIG. 7 is a view explaining a radius of curvature in a raceway surface and a diameter of each ball in a deep groove ball bearing.
FIG. 8 is a view explaining a relation between a ratio of a radius of curvature in a raceway surface relative to a diameter of each ball and an axial rigidity.
FIG. 9 is a view explaining a relation between a ratio of a radius of curvature in a raceway surface relative to a diameter of each ball and an axial internal gap.

With reference to FIG. 1 and FIG. 2, FIG. 4 and FIG. 5, and FIG. 7 to FIG. 9, the power transmission mechanism of the third embodiment will be described. FIG. 7 is a view explaining a radius of curvature in a raceway surface and a diameter of each ball in a deep groove ball bearing. FIG. 8 is a view explaining a relation between a ratio of the radius of curvature in the raceway surface relative to the diameter of each ball and an axial rigidity. FIG. 9 is a view explaining a relation between the ratio of the radius of curvature in the raceway surface relative to the diameter of each ball and an axial internal gap. In the description of the third embodiment, description of the same configurations as those of the second embodiment will be omitted, and the reference numerals thereof will be used.

[3-1. Basic Configuration]

First, the power transmission mechanism 1 of the third embodiment will be described with reference to FIG. 1 and FIG. 2. In the power transmission mechanism 1 of the third embodiment, the first to the third bearings 4, 5, 6 are all composed of ball bearings, which is different from the second embodiment.

Each of the bearings 5a, 5b of the second bearing 5 is composed of a deep groove ball bearing. The second shaft 20, the second double-helical gear 22, and the third double-helical gear 23 are supported by the second bearing 5 being a bearing pair (the second bearing pair) composed of two deep groove ball bearings.

[3-2. Relation Between Ratio of Radius of Curvature in Raceway Surface Relative to Ball Diameter and Amount of Axial Displacement]

As shown in FIG. 7, each of the first to the third bearings 4, 5, 6 is composed of a deep groove ball bearing 9 composed of balls 91 that are rolling bodies, and a bearing ring 92 having a raceway surface 92a where the balls 91 roll. The bearing ring 92 shown in FIG. 7 is an internal ring of the deep groove ball bearing 9, and an external ring of the deep groove ball bearing 9 is not illustrated in FIG. 7.

In the deep groove ball bearing 9, a diameter of each ball 91 (hereinafter, referred to as a "ball diameter") $R_1$ is so formed as to be equal to or greater than a radius of curvature in the raceway surface 92a (hereinafter, referred to as a "raceway surface radius") $R_2$. A value obtained by dividing the raceway surface radius $R_2$ by the ball diameter $R_1$ is 0.5 or more. That is, a ratio X of the raceway surface radius $R_2$ relative to the ball diameter $R_1$ is 50% or more in terms of percentage. In this description, the ratio X is represented in terms of percentage. In addition, in the following description, the "ratio X of the raceway surface radius $R_2$ relative to the ball diameter $R_1$" is referred to simply as the "ratio X".

Since the raceway surface radius $R_2$ becomes greater at the axial both ends of the raceway surface 92a than at the axial center thereof, the raceway surface radius $R_2$ becomes a maximum value in the radius of curvature at both axial ends of the raceway surface 92a. This means that the ratio X obtained by dividing the maximum value of the raceway surface radius $R_2$ by the ball diameter $R_1$ is a minimum value of the ratio X in this deep groove ball bearing 9.

In the third embodiment, with respect to minimum values of the ratios X of the first to the third bearings 4, 5, 6, the minimum value of the ratio X of the bearing supporting the rotation shaft (the intermediate shaft) having the multiple double-helical gears is different from the minimum value of the ratio X of the bearing supporting the rotational shaft having the single double-helical gear.

Here, the minimum value of the ratio X of the raceway surface radius $R_2$ relative to the ball diameter $R_1$ in the deep groove ball bearing 9 represents an amount of axial displacement of the bearing of interest relative to an axial force (thrust force) generated at the meshing part between the double-helical gears. As the minimum value of the ratio X becomes greater, the amount of the axial displacement of the deep groove ball bearing 9 becomes greater. To the contrary, as the minimum value of the ratio X becomes smaller, the amount of the axial displacement of the deep groove ball bearing 9 becomes smaller.

[3-2-1. Relation Between Ratio of Radius of Curvature in Raceway Surface Relative to Ball Diameter and Axial Rigidity]

With reference to FIG. 8, a relation between the ratio X and the axial rigidity of the deep groove ball bearing 9 will be described. In FIG. 8, for the purpose of explaining the differences in axial rigidity, the respective cases of the ratio X>52%, of the ratio X=52%, and of X=50% are exemplified. The ratio X shown in FIG. 8 is a minimum value of the ratio X.

As shown in FIG. 8, the axial rigidity of the deep groove ball bearing 9 becomes greater in the order of the case of the ratio X of more than 52%, the case of the ratio X of 52%, and the case of the ratio X of 50%. In this manner, it is appreciated that in the deep groove ball bearing 9, as the ratio X becomes smaller, the axial rigidity becomes greater. This means that the ratio X represents a magnitude of the axial rigidity of the deep groove ball bearing 9 relative to the thrust force generated at the meshing part. That is, even between the deep groove ball bearings 9, if their ratios X are different, the magnitudes of their axial rigidities also become different.

[3-2-2. Relation Between Ratio of Raceway Surface Radius Relative to Ball Diameter and Axial Internal Gap]

With reference to FIG. 9, a relation between the ratio X and the axial internal gap of the deep groove ball bearing 9 will be described. In FIG. 9, for the purpose of explaining difference in the axial internal gap of the ball bearing of interest, the respective cases of the ratio X>52%, of the ratio X of 52%, and of the ratio X of 50% will be exemplified. In addition, the ratio X shown in FIG. 9 is a minimum value of the ratio X.

As shown in FIG. 9, the axial internal gap of the deep groove ball bearing 9 becomes smaller in the order of the case of the ratio X of more than 52%, the case of the ratio X of 52%, and the case of the ratio X of 50%. In this manner, it is appreciated that in the deep groove ball bearing 9, as the ratio X becomes smaller, the axial internal gap becomes smaller. That is, the ratio X represents an amount of axial displacement (movable amount) of the deep groove ball bearing 9 relative to the thrust force generated at the meshing part. That is, even between the deep groove ball bearings 9, if their ratios X are different, the magnitudes of their axial internal gaps also become different.

In the power transmission mechanism 1 of the third embodiment, the second bearing 5 is so formed as to have a smaller minimum value of the ratio X of the deep groove ball bearing 9 than that of the first bearing 4 and the third bearing 6. For example, each of the bearings 4a, 4b of the first bearing 4 is configured to have the ratio X of 52% or more. Each of the bearings 5a, 5b of the second bearing 5 is configured to have the ratio X of less than 52%. Each of the bearings 6a, 6b of the third bearing 6 is configured to have the ratio X of 52% or more. Through this, the second bearing 5 has a greater axial rigidity (smaller amount of axial displacement) than that of the first bearing 4 and the third bearing 6. The second bearing 5 has a smaller axial internal gap (smaller amount of axial displacement) than that of the first bearing 4 and the third bearing 6.

In the power transmission mechanism 1, the double-helical gears and the rotational shaft are integrally formed; therefore, that the deep groove ball bearing 9 of interest has a smaller minimum value of the ratio X represents that it is more difficult for the double-helical gear to move in the axial direction relative to the thrust force generated at the meshing part of the double-helical gears.

For example, when the single-flank contact of the double-helical gears is caused at the meshing part 2a of the first gear pair 2, since the first bearing 4 has a smaller minimum value of the ratio X than that of the second bearing 5, the first double-helical gear 11 on the first shaft 10 side mainly moves in the axial direction due to the thrust force generated at the meshing part 2a, and the axial behavior of the second double-helical gear 22 on the second shaft 20 side becomes smaller. Through this, although the second double-helical gear 22 does not actively move in the axial direction due to the error component at the meshing part 2a, it is possible to exert the aligning effect of the first gear pair 2 due to the axial behavior of the first double-helical gear 11 on the first bearing 4 side whose minimum value of the ratio X is relatively small.

When the single-flank contact of the double-helical gears is caused at the meshing part 3a of the second gear pair 3, since the third bearing 6 has a greater minimum value of the ratio X than that of the second bearing 5, the fourth double-helical gear 34 on the third shaft 30 mainly moves in the axial direction due to the thrust force generated at the meshing part 3a, and the axial behavior of the third double-helical gear 23 on the second shaft 20 side becomes smaller. Through this, although the third double-helical gear 23 does not actively move in the axial direction due to the error component at the meshing part 3a, it is possible to exert the aligning effect of the second gear pair 3 due to the axial behavior of the fourth double-helical gear 34 on the third bearing 6 side having a relatively smaller minimum value of the ratio X.

[3-3. Vehicle Example of Third Embodiment]

The power transmission mechanism of the third embodiment may be installed in the vehicle Ve shown in FIG. 4 and FIG. 5.

In the first vehicle example shown in FIG. 4, since the first bearing 4 has a greater minimum value of the ratio X than that of the second bearing 5, the output gear 105 more easily moves in the axial direction relative to the thrust force generated at the meshing part 110a of the counter gear pair 110 than the counter driven gear 106a does. In addition, since the third bearing 6 also has a greater minimum value of the ratio X than that of the second bearing 5, the differential ring gear 35 more easily moves in the axial direction relative to the thrust force generated at the meshing part 120a of the final gear pair 120 than the drive pinion gear 106b does.

In the power transmission mechanism 1 of the second vehicle example shown in FIG. 5, the fourth bearing 8 is a deep groove ball bearing, and is so formed as to have a greater minimum value of the ratio X than that of the second bearing 5. Hence, the fifth double-helical gear 45 more easily moves in the axial direction relative to the thrust force generated at the meshing part 7a of the third gear pair 7 than the second double-helical gear 22 does.

In the driving unit 100 of the second vehicle example shown in FIG. 5, since the fourth bearing 8 has a greater minimum value of the ratio X than that of the second bearing 5, the reduction gear 109 more easily moves in the axial direction relative to the thrust force generated at the meshing part 130a of the reduction gear pair 130 than the counter driven gear 106a does.

As aforementioned, according to the third embodiment, the second bearing 5 has a smaller minimum value of the ratio X than that of the first bearing 4 and the third bearing 6; therefore, it is possible to suppress the aligning effects of the first gear pair 2 and the second gear pair 3 from being mutually hindered on the second shaft 20. Through this, it is possible to suppress the axial behaviors of the double-helical gears from interfering with each other, to thereby mutually secure the aligning effects thereof. Accordingly, the aligning effects of the double-helical gears properly work, to thereby suppress generation of noises and vibrations at the meshing part.

The present disclosure is not limited to the aforementioned third embodiment, and may appropriately be modified without departing from the scope of the disclosure.

For example, the ratio X of the deep groove ball bearing 9 is not limited to the above-described values. That is, this ratio may be any value as far as the minimum value of the ratio X of the second bearing 5 is relatively smaller than that of the first bearing 4 and the third bearing 6.

The second bearing 5 may have any minimum value of the ratio X as far as this minimum value of the ratio X is smaller than at least one of that of the first bearing 4 and the third bearing 6. In this case, it is also possible to suppress the aligning effect of the first gear pair 2 and the aligning effect of the second gear pair 3 from being mutually hindered on the second shaft 20.

As one example, the second bearing 5 may be so formed as to have a smaller minimum value of the ratio X than that of the first bearing 4, and also have a minimum value of the ratio X greater than or equal to that of the third bearing 6. In this case, the minimum value of the ratio X becomes smaller in the order of "the first bearing 4>the second bearing 5≥the third bearing 6". Through this, the aligning effect of the first gear pair 2 is secured not by the axial behavior of the second double-helical gear 22, but by the axial behavior of the first double-helical gear 11.

As another example, the second bearing 5 may be so formed as to have a smaller minimum value of the ratio X than that of the third bearing 6, and also have a minimum value of the ratio X greater than or equal to that of the first bearing 4. In this case, the minimum value of the ratio X becomes smaller in the order of "the third bearing 6>the second bearing 5≥the first bearing 4". Through this, the aligning effect of the second gear pair 3 is secured not by the axial behavior of the third double-helical gear 23, but by the axial behavior of the fourth double-helical gear 34. The power transmission mechanism of the present disclosure may be defined as follows. A power transmission mechanism includes: a first shaft including a first double-helical gear; a second shaft including a second double-helical gear and a third double-helical gear, the second double-helical gear configured to mesh with the first double-helical gear, the third double-helical gear being arranged adjacent to the second double-helical gear in a direction of the second shaft; a third shaft including a fourth double-helical gear configured to mesh with the third double-helical gear; a first bearing being a rolling bearing rotatably supporting the first shaft; a second bearing being a rolling bearing rotatably supporting the second shaft; and a third bearing being a rolling bearing rotatably supporting the third shaft, wherein the first double-helical gear and the first shaft are configured to integrally rotate, and also integrally move in an axial direction, the second double-helical gear, the third double-helical gear, and the second shaft are configured to integrally rotate, and also integrally move in the axial direction, the fourth double-helical gear and the third shaft are configured to integrally rotate, and also integrally move in the axial direction, and the second bearing is configured such that at least one of conditions i) and ii) is satisfied: i) an amount of axial displacement of the second bearing relative to a force in the axial direction generated at a meshing part between the first double-helical gear and the second double-helical gear is smaller than an amount of axial displacement of the first bearing relative to a force in the axial direction generated at a meshing part between the first double-helical gear and the second double-helical gear, and ii) an amount of axial displacement of the second bearing relative to a force in the axial direction generated at a meshing part between the third double-helical gear and the fourth double-helical gear is smaller than an amount of axial displacement of the third bearing relative to a force in the axial direction generated at a meshing part between the third double-helical gear and the fourth double-helical gear. An axial rigidity of the second bearing may be greater than at least one of an axial rigidity of the first bearing and an axial rigidity of the third bearing. An axial internal gap of at least one of the first bearing and the third bearing may be greater than an axial internal gap of the second bearing. The axial internal gap is an amount of movement of one bearing ring of internal and external bearing rings when the one bearing ring moves in the axial direction with the other bearing ring of the internal and the external bearing rings being fixed. The second bearing may be a bearing to which pre-compression in the axial direction is applied, and the second bearing may be a bearing of a different type from a type of at least one of the first bearing and the third bearing. The first bearing may comprise any one of a cylindrical roller bearing and a deep groove ball bearing, the second bearing may comprise a taper roller bearing, and the third bearing may comprise any one of a cylindrical roller bearing and a deep groove ball bearing. Each of the first bearing, the second bearing, and the third bearing is a ball bearing that includes bearing rings having raceway surfaces, and balls rolling on the raceway surfaces, and the second bearing may be configured such that at least one of conditions i) and ii) is satisfied: i) a minimum value of a ratio of radius of curvature in the raceway surface relative to a diameter of the ball in the second bearing is smaller than a minimum value of a ratio of radius of curvature in the raceway surface relative to a diameter of the ball in the first bearing; and ii) the minimum value of the ratio of radius of curvature in the raceway surface relative to the diameter of the ball in the second bearing is smaller than a minimum value of a ratio of radius of curvature in the raceway surface relative to a diameter of the ball in the third bearing. The first bearing may comprise a deep groove ball bearing, the second bearing may comprise a deep groove ball bearing, and the third bearing may comprise a deep groove ball bearing. The power transmission mechanism may include a fourth shaft including: a fifth double-helical gear meshing with the second double-helical gear; and a fourth bearing being a rolling bearing rotatably supporting the fourth shaft, wherein the second bearing may be configured such that an amount of axial displacement of the second bearing relative to a force in the axial direction generated at a meshing part between the second double-helical gear and the fifth double-helical gear is smaller than an amount of axial displacement of the fourth bearing relative to a force in the axial direction generated at a meshing part between the second double-helical gear and the fifth double-helical gear. The axial rigidity of the second bearing may be greater than the axial rigidity of the fourth bearing, and the axial rigidity of the second bearing may be greater than at least one of the axial rigidity of the first bearing and the axial rigidity of the third bearing. The power transmission mechanism may include a fourth shaft including a fifth double-helical gear meshing with the second double-helical gear, and a fourth bearing being a rolling bearing rotatably supporting the fourth shaft. The axial internal gap of the fourth bearing may be greater than the axial internal gap of the second bearing. The second bearing may be a bearing of a different type from a type of the fourth bearing, and the second bearing may be a bearing of a different type from a type of at least one of the first bearing and the third bearing. Each of the first bearing, the second bearing, the third bearing, and the fourth bearing is a ball bearing that includes bearing rings having raceway surfaces, and balls rolling on the raceway surfaces, the second bearing may be configured such that a minimum value of a ratio of radius of curvature in the raceway surface relative to a diameter of the ball in the second bearing is smaller than a minimum value of a ratio of radius of curvature in the raceway surface relative to a diameter of the ball in the fourth bearing, and the second bearing may be configured such that at least one of conditions i) and ii) is satisfied: i) the minimum value of the ratio of radius of curvature in the raceway surface relative to the diameter of the ball in the second bearing is smaller than a minimum value of a ratio of radius of curvature in the raceway surface relative to a diameter of the ball in the first bearing; and ii) the minimum value of the ratio of radius of curvature in the raceway surface relative to the diameter of the ball in the second bearing is smaller than a minimum value of a ratio of radius of curvature in the raceway surface relative to a diameter of the ball in the third bearing.

What is claimed is:

1. A power transmission mechanism comprising:
a first shaft including a first double-helical gear;
a second shaft including a second double-helical gear and a third double-helical gear, the second double-helical gear configured to mesh with the first double-helical gear, the third double-helical gear being arranged adjacent to the second double-helical gear in a direction of the second shaft;
a third shaft including a fourth double-helical gear configured to mesh with the third double-helical gear;
a first bearing being a rolling bearing rotatably supporting the first shaft and axially moveable;
a second bearing being a rolling bearing rotatably supporting the second shaft and axially moveable; and
a third bearing being a rolling bearing rotatably supporting the third shaft and axially moveable,
the first double-helical gear and the first shaft being configured to integrally rotate, and integrally move in an axial direction,
the second double-helical gear, the third double-helical gear, and the second shaft being configured to integrally rotate, and integrally move in the axial direction,
the fourth double-helical gear and the third shaft being configured to integrally rotate, and integrally move in the axial direction, and
the second bearing being configured such that at least one of conditions i) and ii) is satisfied:
i) an amount of axial displacement of the second bearing relative to a force in an axial direction generated at a meshing part between the first double-helical gear and the second double-helical gear is smaller than an amount of axial displacement of the first bearing relative to a force in an axial direction generated at a meshing part between the first double-helical gear and the second double-helical gear, and
ii) an amount of axial displacement of the second bearing relative to a force in an axial direction generated at a meshing part between the third double-helical gear and the fourth double-helical gear is smaller than an amount of axial displacement relative of the third bearing relative to a force in an axial direction generated at a meshing part between the third double-helical gear and the fourth double-helical gear.

2. The power transmission mechanism according to claim 1, wherein
an axial rigidity of the second bearing is greater than at least one of an axial rigidity of the first bearing and an axial rigidity of the third bearing.

3. The power transmission mechanism according to claim 1, wherein
an axial internal gap of at least one of the first bearing and the third bearing is greater than an axial internal gap of the second bearing, and the axial internal gap is an amount of movement of one bearing ring of internal and external bearing rings when the one bearing ring moves in the axial direction with the other bearing ring of the internal and the external bearing rings being fixed.

4. The power transmission mechanism according to claim 1, wherein
the second bearing is a bearing to which pre-compression in the axial direction is applied, and the second bearing is a bearing of a different type from a type of at least one of the first bearing and the third bearing.

5. The power transmission mechanism according to claim 1, wherein
the first bearing comprises any one of a cylindrical roller bearing and a deep groove ball bearing, the second bearing comprises a taper roller bearing, and the third bearing comprises any one of a cylindrical roller bearing and a deep groove ball bearing.

6. The power transmission mechanism according to claim 2, wherein
each of the first bearing, the second bearing, and the third bearing is a ball bearing that includes bearing rings having raceway surfaces, and balls rolling on the raceway surfaces, and
the second bearing is configured such that at least one of conditions i) and ii) is satisfied:
i) a minimum value of a ratio of radius of curvature in the raceway surface relative to a diameter of the ball in the second bearing is smaller than a minimum value of a ratio of radius of curvature in the raceway surface relative to a diameter of the ball in the first bearing; and ii) the minimum value of the ratio of radius of curvature in the raceway surface relative to the diameter of the ball in the second bearing is smaller than a minimum value of a ratio of radius of curvature in the raceway surface relative to a diameter of the ball in the third bearing.

7. The power transmission mechanism according to claim 6, wherein
the first bearing comprises a deep groove ball bearing, the second bearing comprises a deep groove ball bearing, and the third bearing comprises a deep groove ball bearing.

8. The power transmission mechanism according to claim 1 further comprising:
a fourth shaft including a fifth double-helical gear meshing with the second double-helical gear; and
a fourth bearing being a rolling bearing rotatably supporting the fourth shaft,
wherein
the second bearing is configured such that an amount of axial displacement of the second bearing relative to a force in an axial direction generated at a meshing part between the second double-helical gear and the fifth double-helical gear is smaller than an amount of axial displacement of the fourth bearing relative to a force in an axial direction generated at a meshing part between the second double-helical gear and the fifth double-helical gear.

9. The power transmission mechanism according to claim 8, wherein
an axial rigidity of the second bearing is greater than an axial rigidity of the fourth bearing, and an axial rigidity of the second bearing is greater than at least one of an axial rigidity of the first bearing and the axial rigidity of the third bearing.

10. The power transmission mechanism according to claim 3 further comprising:
a fourth shaft including a fifth double-helical gear configured to mesh with the second double-helical gear; and
a fourth bearing being a rolling bearing rotatably supporting the fourth shaft,
wherein
the axial internal gap of the fourth bearing is greater than the axial internal gap of the second bearing.

11. The power transmission mechanism according to claim 8, wherein
the second bearing is a bearing of a different type from a type of the fourth bearing, and the second bearing is a bearing of a different type from a type of at least one of the first bearing and the third bearing.

12. The power transmission mechanism according to claim 9, wherein
each of the first bearing, the second bearing, the third bearing, and the fourth bearing is a ball bearing that includes bearing rings having raceway surfaces, and balls rolling on the raceway surfaces,
the second bearing is configured such that a minimum value of a ratio of radius of curvature in the raceway surface relative to a diameter of the ball in the second bearing is smaller than a minimum value of a ratio of radius of curvature in the raceway surface relative to a diameter of the ball in the fourth bearing, and the second bearing is configured such that at least one of conditions i) and ii) is satisfied:
i) the minimum value of the ratio of radius of curvature in the raceway surface relative to the diameter of the ball in the second bearing is smaller than a minimum value of a ratio of radius of curvature in the raceway surface relative to a diameter of the ball in the first bearing; and
ii) the minimum value of the ratio of radius of curvature in the raceway surface relative to the diameter of the ball in the second bearing is smaller than a minimum value of a ratio of radius of curvature in the raceway surface relative to a diameter of the ball in the third bearing.

13. The power transmission mechanism according to claim 3, wherein
each of the first bearing, the second bearing, and the third bearing is a ball bearing that includes bearing rings having raceway surfaces, and balls rolling on the raceway surfaces, and
the second bearing is configured such that at least one of conditions i) and ii) is satisfied:
i) a minimum value of a ratio of radius of curvature in the raceway surface relative to a diameter of the ball in the second bearing is smaller than a minimum value of a ratio of radius of curvature in the raceway surface relative to a diameter of the ball in the first bearing; and
ii) the minimum value of the ratio of radius of curvature in the raceway surface relative to the diameter of the ball in the second bearing is smaller than a minimum value of a ratio of radius of curvature in the raceway surface relative to a diameter of the ball in the third bearing.

14. The power transmission mechanism according to claim 10, wherein
the second bearing is a bearing of a different type from a type of the fourth bearing, and the second bearing is a bearing of a different type from a type of at least one of the first bearing and the third bearing.

15. The power transmission mechanism according to claim 10, wherein
each of the first bearing, the second bearing, the third bearing, and the fourth bearing is a ball bearing that includes bearing rings having raceway surfaces, and balls rolling on the raceway surfaces,
the second bearing is configured such that a minimum value of a ratio of radius of curvature in the raceway surface relative to a diameter of the ball in the second bearing is smaller than a minimum value of a ratio of radius of curvature in the raceway surface relative to a diameter of the ball in the fourth bearing, and
the second bearing is configured such that at least one of conditions i) and ii) is satisfied:
i) the minimum value of the ratio of radius of curvature in the raceway surface relative to the diameter of the ball in the second bearing is smaller than a minimum value of a ratio of radius of curvature in the raceway surface relative to a diameter of the ball in the first bearing; and
ii) the minimum value of the ratio of radius of curvature in the raceway surface relative to the diameter of the ball in the second bearing is smaller than a minimum value of a ratio of radius of curvature in the raceway surface relative to a diameter of the ball in the third bearing.

16. The power transmission mechanism according to claim 1, wherein the first shaft, the second shaft, and the third shaft are separated vertically.

* * * * *